United States Patent
Pillai

(10) Patent No.: US 8,179,260 B2
(45) Date of Patent: May 15, 2012

(54) SYSTEM AND METHOD OF READING RFID TAGS AT HIGH SPEEDS

(75) Inventor: Vijay Pillai, Mukilteo, WA (US)

(73) Assignee: Intermec IP Corp., Everett, WA (US)

( * ) Notice: Subject to any disclaimer, the term of this patent is extended or adjusted under 35 U.S.C. 154(b) by 647 days.

(21) Appl. No.: 12/361,749

(22) Filed: Jan. 29, 2009

(65) Prior Publication Data

US 2010/0188225 A1    Jul. 29, 2010

(51) Int. Cl.
   *G08B 13/14* (2006.01)
(52) U.S. Cl. .................. 340/572.1; 340/10.1; 340/572.4
(58) Field of Classification Search ................ 340/572.1
   See application file for complete search history.

(56) References Cited

U.S. PATENT DOCUMENTS

| | | |
|---|---|---|
| 2005/0179521 A1 | 8/2005 | Pillai et al. |
| 2008/0040210 A1* | 2/2008 | Hedley ............................ 705/13 |
| 2008/0266059 A1* | 10/2008 | Murofushi et al. .......... 340/10.3 |
| 2009/0179740 A1 | 7/2009 | Pillai et al. |
| 2009/0207024 A1* | 8/2009 | Schatz et al. ............... 340/572.1 |
| 2010/0060423 A1 | 3/2010 | Pillai |

* cited by examiner

*Primary Examiner* — George Bugg
*Assistant Examiner* — Kerri McNally
(74) *Attorney, Agent, or Firm* — Seed IP Law Group PLLC

(57) ABSTRACT

Processing a transponder signal received from a transponder may include providing a first signal that is in-phase with the transponder signal and a second that is off-phase with the first signal. A first transformed signal is generated using the first signal, where the first transformed signal has a first characteristic equal to the first characteristic of the first signal and a second characteristic different from the second characteristic of the first signal. A second transformed signal is generated using the second signal, where the second transformed signal has a first characteristic equal to the first characteristic of the second signal and a second characteristic different from the second characteristic of the second signal. Information incorporated in the transponder signal is obtained using a combination of the first transformed signal and the second transformed signal.

27 Claims, 6 Drawing Sheets

SYSTEM AND METHOD OF READING RFID TAGS AT HIGH SPEEDS

BACKGROUND

1. Technical Field

This disclosure generally relates to the field of radio frequency identification (RFID), and more particularly to reading RFID transponders.

2. Description of the Related Art

In general, an RFID system is a system of automatic identification of objects using information stored in and retrieved from RFID tags, also known as RFID transponders. The use of RFID to identify and track objects remotely and automatically has been steadily increasing in the past few decades. In enterprises, for example, RFID is used as a tool in supply chain management to improve the efficiency of inventory tracking and management. RFID is also widely employed around the world on roads and highways to collect toll payment in one application, and to identify travelers at borders in another application, such as the NEXUS frequent traveler program between the U.S. and Canada.

An RFID system typically includes RFID transponders and at least one RFID reader, also known as an RFID interrogator. Most RFID transponders contain two basic components. The first component is an antenna for receiving and transmitting RF signals. The second component is an integrated circuit (IC) that may be configured to store information, process information, modulate and demodulate RF signals. There are typically three types of RFID transponders: passive, active, and semi-passive. Passive transponders contain no internal power source and thus rely solely on the RFID reader as the power source. The active and semi-passive transponders have an internal power source, although in active transponders the internal power source is used both to power the IC and to broadcast a response signal to an RFID reader while in semi-passive transponders it is used to power the IC but not for broadcasting the response signal. In operation, an RFID reader transmits RF signals as queries and an RFID transponder receiving the queries generates and transmits a response signal, typically including the identification of an object which the responding RFID transponder is affixed to or otherwise associated with. The response signal is received by the RFID reader and is decoded for further processing.

As much as RFID is used in a wide variety of applications ranging from product tracking and inventory management to toll payments, there nevertheless are limitations associated with the use of an RFID system. For instance, at present time, there is a speed limit of about 15 miles per hour (mph) for reading transponders on moving objects. Beyond that speed, an RFID reader will likely fail to read the moving transponder or have significantly increased number of decode failures due to drooping in the amplitude of the received signal and inversion of the phase of the signal as a result of the speed. This means, for instance, the driver having a NEXUS card with an embedded RFID transponder or an RFID transponder in the form of a windshield sticker would have to slow down in order for the transponder to be read when crossing a border or a toll booth utilizing RFID technology. The fact that each driver has to slow down to a speed of lower than 15 mph can cause congestion on major roadways. Similarly, in other applications, the limit on the relative speed between an RFID transponder and an RFID reader likely imposes a problem when efficiency or time is of the essence.

BRIEF SUMMARY

In one aspect, a method of processing a transponder signal received from a transponder to identify the transponder includes providing a first signal that is in-phase with the transponder signal, the first signal having a first and a second characteristics, and providing a second signal that is off-phase with the first signal, the second signal having a first and a second characteristics. A first transformed signal is generated by altering the first characteristic of the first signal and retaining the second characteristic of the first signal to provide the first transformed signal. A second transformed signal is generated by altering the first characteristic of the second signal and retaining the second characteristic of the second signal to provide the second transformed signal. Information incorporated in the transponder signal is obtained using a combination of the first transformed signal and the second transformed signal.

In another aspect, a method of operating a transponder reader includes receiving a first signal from the transponder and providing a second signal that differs from the first signal in phase. A first transformed signal is generated from the first signal, and a second transformed signal is generated from the second signal. The first transformed signal is greater than the first signal in amplitude and has the same sign as the first signal. The second transformed signal is greater than the second signal in amplitude and has the same sign as the second signal. A resultant signal is provided using the first transformed signal and the second transformed signal. The resultant signal is decoded to provide information encoded in the received signal.

In one aspect, a communication system includes a first circuit, a second circuit, and a third circuit. The first circuit receives a wireless signal from a signal source, and provides a first signal that is in-phase with the wireless signal and a second signal that differs from the first signal in phase using the wireless signal. The second circuit receives the first and the second signals and to generate a first transformed signal and a second transformed signal from the first signal and the second signal, respectively. The first transformed signal is greater than the first signal in amplitude and has the same sign as the first signal. The second transformed signal is greater than the second signal in amplitude and has the same sign as the second signal. The third circuit receives the first and the second transformed signals and derives information encoded in the wireless signal using the first and the second transformed signals.

In one aspect, an RFID system includes at least one antenna and a processing logic coupled to the at least one antenna. The at least one antenna receives a transponder signal. The processing logic provides a first signal and a second signal based on the transponder signal, and transforms the first and the second signals into a first transformed signal and a second transformed signal, respectively. The first transformed signal is a multiple of the first signal and has the same sign as the first signal, and the second transformed signal is a multiple of the second signal and has the same sign as the second signal. The processing logic combines the first and the second transformed signals to determine information encoded in the transponder signal.

Figure 1:
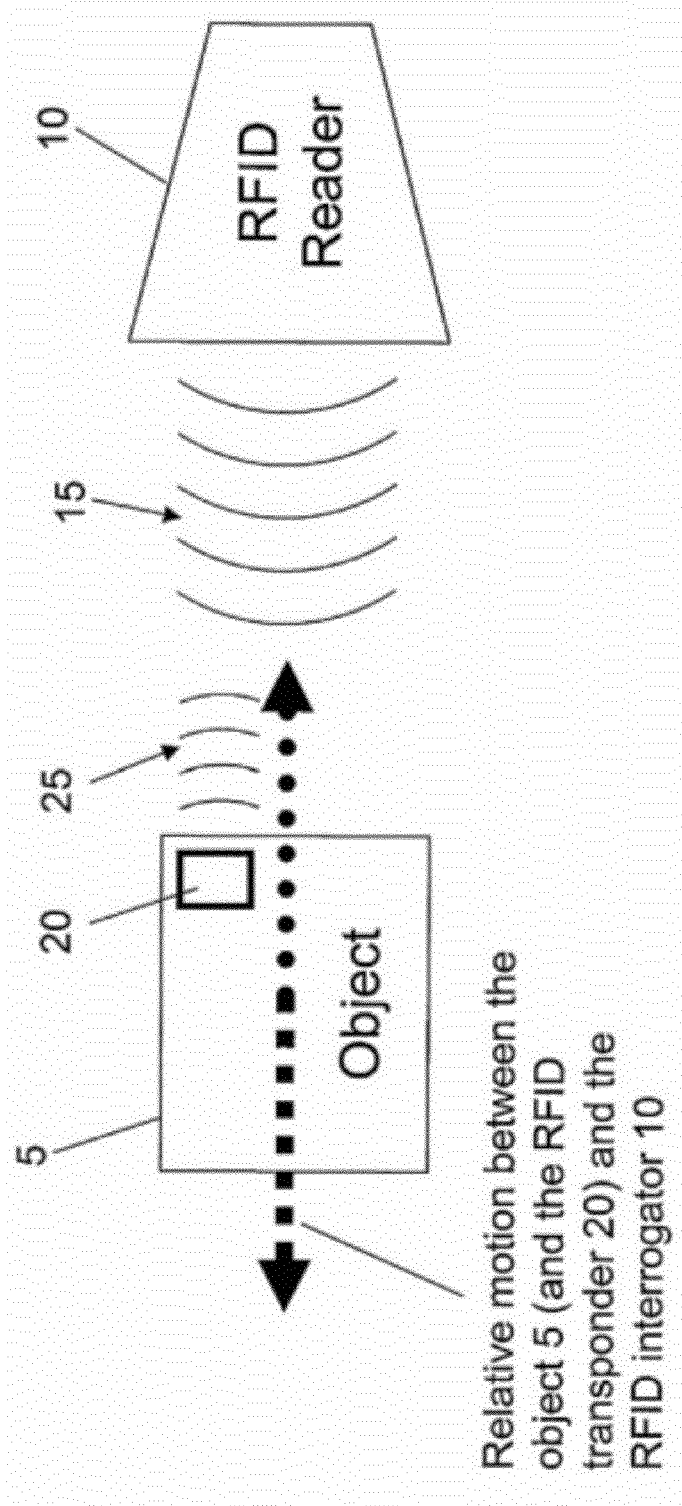
FIG. 1 is a simplified diagram of an RFID system.

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with RFID readers, transponders, and systems have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings and Abstract of the Disclosure provided herein are for convenience only and do not interpret the scope or meaning of the embodiments.

FIG. 1 illustrates an RFID system 1. The RFID system 1 includes an object 5, an RFID reader 10, and an RFID transponder 20. The RFID transponder 20 may be a passive, active, or semi-passive transponder, and is affixed to, coupled to, attached to, or otherwise associated with, the object 5. In operation, the RFID reader 10 transmits a query signal 15 and, in response, the RFID transponder 20 transmits a transponder signal 25. The RFID reader 10 receives the transponder signal 25 and "reads" the RFID transponder 20. In particular, upon receiving the transponder signal 25, the RFID reader 10 decodes the transponder signal 25 to obtain information (e.g., identification information that identifies the particular RFID transponder 20) that is encoded in the transponder signal 25.

The RFID reader 10 may consist of one or more components including a transmitter, a receiver (or a transceiver in place of a separate transmitter and a separate receiver), one or more antennas, and a processing system. The multiple components of the RFID reader 10 may be combined in a single piece of equipment or, alternatively, in separate pieces of equipment. For example, the RFID reader 10 may include a transmitter, a receiver, and a base station coupled to the transmitter and receiver to process the signals. For simplicity, the RFID reader 10 is shown as one piece of equipment in FIG. 1.

As shown in FIG. 1, a relative speed between the RFID reader 10 or antenna threads and the object 5, and hence between the RFID reader 10 and the RFID transponder 20, may exist. For example, in the toll payment scenario described above, the RFID reader 10 may be installed at a highway toll booth or over a roadway, the object 5 may be a vehicle, and the RFID transponder 20 may be an RFID tag adhered to the front windshield of the vehicle. In such case, as the vehicle approaches the toll booth, there is a relative speed between the RFID transponder 20 and the RFID reader 10.

The RFID reader 10 typically includes an I (in-phase) channel and a Q (quadrature, or being 90 degrees different in phase) channel in its receiver. The transponder signal 25 received by the RFID reader 10 may be seen on both the I channel and the Q channel, but sometimes only on one of the I and Q channels depending on the location of the RFID transponder 20. For a stationary transponder, the amplitude of the transponder signal 25 as seen on either or both of the I and Q channels stays the same. When there is a relative speed between the RFID transponder 20 and the RFID reader 10, however, the amplitude of the transponder signal 25 varies on the I channel, and can be generally represented mathematically as $A(t) \cdot \cos(\omega t + \omega_{amplitude} t)$, where A(t)=the amplitude of the transponder signal as a function of time and as the backscattered signal sent by the transponder;

t=time;

ω=the angular frequency of the carrier signal; and $\omega_{amplitude}$=the rate of change of amplitude, and is given by $\omega_{amplitude} = 4\pi \cdot (v/\lambda)$, where v=the wavelength of the carrier; and λ=the velocity of the transponder with respect to the reader.

Figure 2:
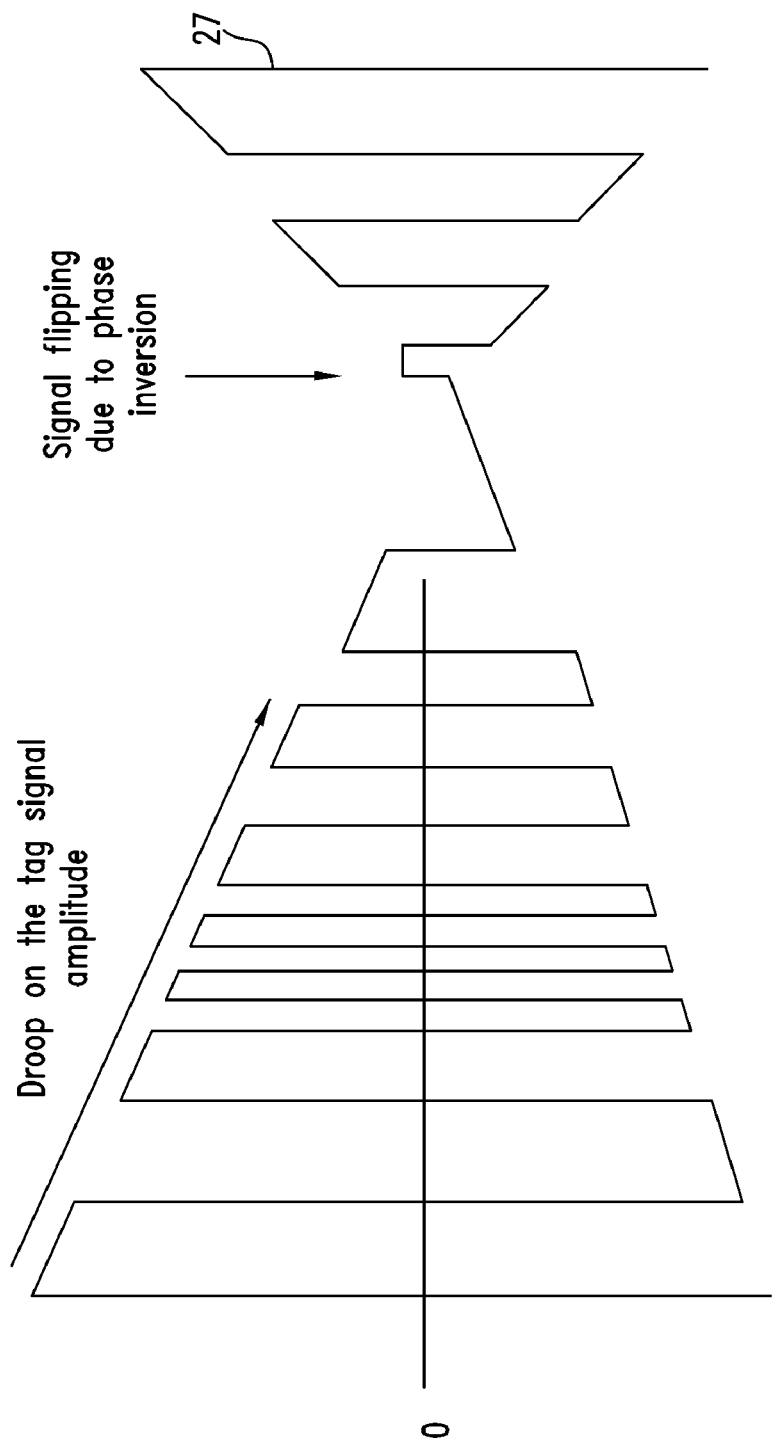
FIG. 2 is a diagram showing a transponder signal received from a transponder moving at a relatively high speed.

The main contribution to a change in the amplitude, A, of the transponder signal 25 is that, as the distance between the RFID transponder 20 and the RFID reader 10 varies, additional phase change is introduced in the down-converted I or Q channel signal and thereby changes the amplitude. At a slow speed, there is negligible change in the amplitude of the received signal. As the relative speed of the RFID transponder 20 increases, however, significant phase change can occur right within a packet of information that is encoded in the received transponder signal 25. More specifically, there may be a droop in the amplitude of the signal, and an inversion of the phase of the signal 27 may occur in the middle of the packet of information, as shown in FIG. 2. This will render it difficult to decode the information and therefore difficult to read the RFID transponder 20.

Figure 3:
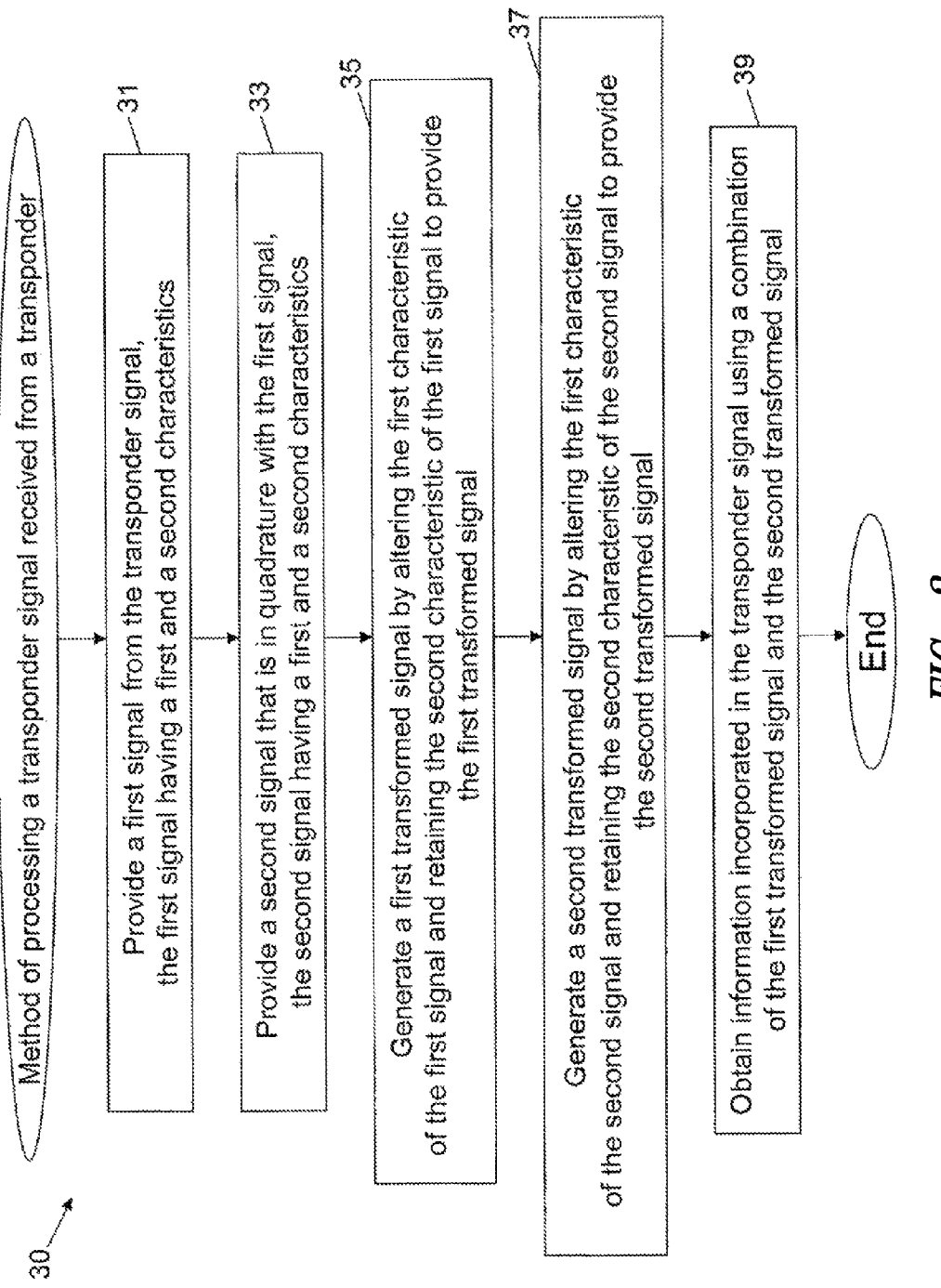
FIG. 3 is a flow chart showing a method of processing a transponder signal received from a transponder according to one non-limiting illustrated embodiment.

FIG. 3 illustrates a method 30 to process a transponder signal received from a transponder according to one non-limiting illustrated embodiment. At 31, a first signal is provided from the transponder signal, where the first signal has a first characteristic and a second characteristic. At 33, a second signal that is in quadrature phase with the first signal is provided, where the second signal has a first characteristic and a second characteristic. At 35, a first transformed signal is generated by altering the first characteristic of the first signal and retaining the second characteristic of the first signal to provide the first transformed signal. At 37, a second signal is generated by altering the first characteristic of the second signal and retaining the second characteristic of the second signal to provide the second transformed signal. At 39, information incorporated (e.g., encoded) in the transponder signal is obtained using a combination of the first transformed signal and the second transformed signal.

In one embodiment, the first transformed signal is generated by squaring the value of the first signal and retaining the sign of the first signal to provide the first transformed signal. Similarly, the second transformed signal is generated by squaring the value of the second signal and retaining the sign of the second signal to provide the second transformed signal. For instance, the transponder signal 25 reaching the RFID reader 10 may be expressed mathematically as $A(t) \cdot \cos(\omega t + \omega_{amplitude} t)$. After down-conversion, during which the frequency of the carrier signal is removed, the resultant I channel signal may be expressed mathematically as $A(t) \cdot \cos(\omega_{amplitude} t)$, and the resultant Q channel signal may be expressed mathematically as $A(t) \cdot \sin(\omega_{amplitude} t)$. Squaring the I and Q channel signals while retaining the respective sign will result in the following transformed signals, respectively:

$$\frac{A \cdot \cos(\omega_{amplitude} t)}{|A \cdot \cos(\omega_{amplitude} t)|} \cdot [A \cdot \cos(\omega_{amplitude} t)]^2 \quad (1)$$

$$\frac{A \cdot \sin(\omega_{amplitude} t)}{|A \cdot \sin(\omega_{amplitude} t)|} \cdot [A \cdot \sin(\omega_{amplitude} t)]^2 \quad (2)$$

where equation (1) represents the transformed I channel signal and equation (2) represents the transformed Q channel signal.

In one embodiment, a combination of the transformed I channel signal and the transformed Q channel signal is used to read the RFID transponder 20. In one embodiment, equations (1) and (2) are summed together to yield a resultant signal, which is decoded as a regular signal to provide the information encoded in the transponder signal 25, such as the identification of the RFID transponder 20 and other related information.

Alternatively, the first transformed signal is generated by squaring the value of the first signal without retaining the sign of the first signal, and the second transformed signal is generated by squaring the value of the second signal without retaining the sign of the second signal. This will result in the first and second transformed signals having only positive amplitude. Such alternative should work in a pure digital signal processing system, because variation in the signal frequency is usually sufficient for the digital values (e.g., 0 and 1) of the information encoded in the signal to be recognized.

The squaring of the value of the I channel signal and the value of the Q channel signal results in the corresponding transformed signals having relatively greater amplitude. The resultant signal, being the sum of the transformed I and Q channel signals, has an amplitude that is greater than the amplitude of the signal 27 shown in FIG. 2. The drooping effect is thus mitigated and the duration that the signal is below a certain threshold under which the signal cannot be decoded is minimized. Therefore, by using the method 30, an RFID reader such as the RFID reader 10 shown in FIG. 1 may be able to read a RFID transponder that is moving at a speed that is greater than 15 mph.

Figure 4:
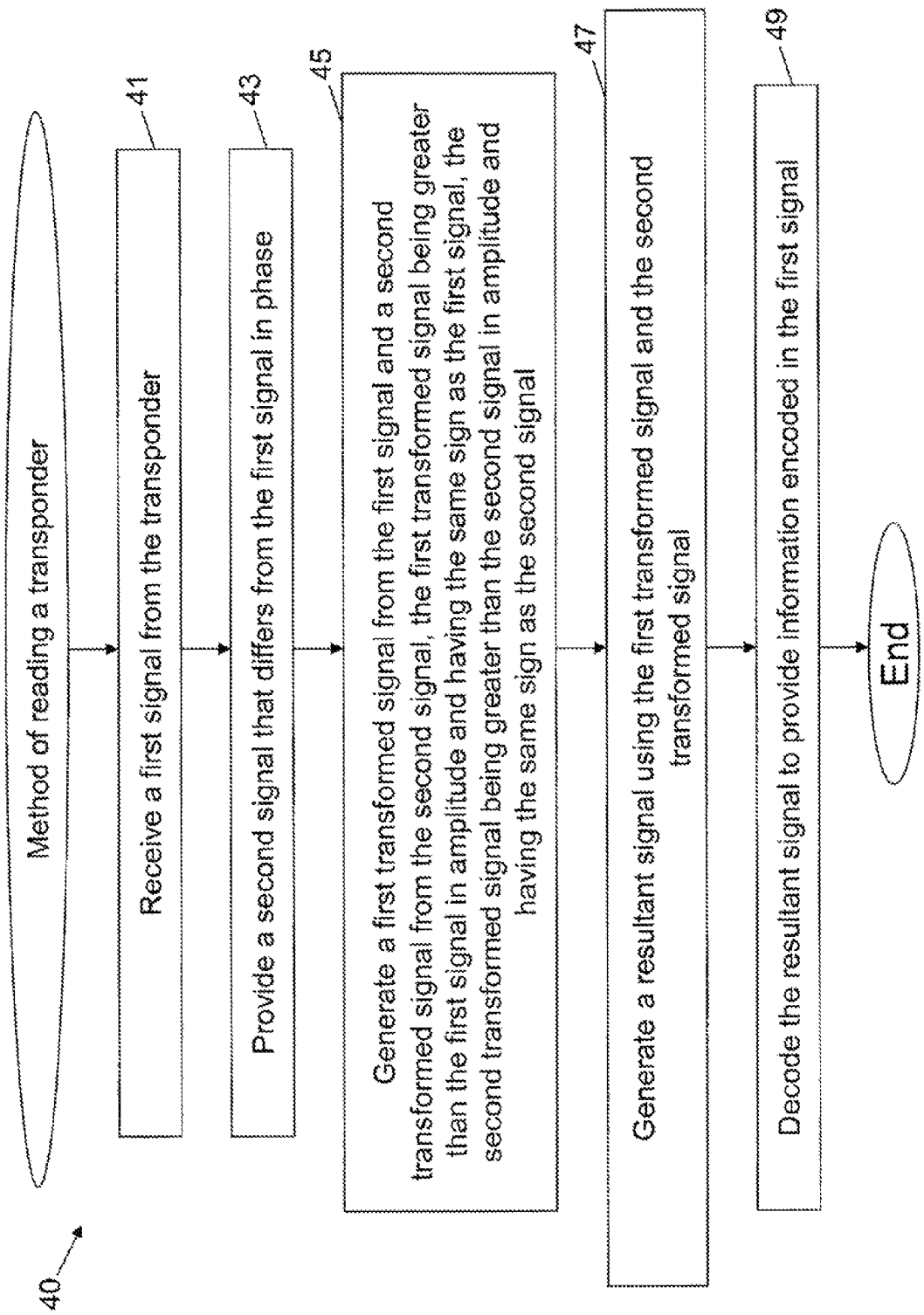
FIG. 4 is a flow chart showing a method of processing a transponder signal according to one non-limiting illustrated embodiment.

FIG. 4 illustrates a method 40 to process a transponder signal according to one non-limiting illustrated embodiment. At 41, a first signal is received from the transponder. At 43, a second signal that differs from the first signal in phase is provided. At 45, a first transformed signal is generated from the first signal, and a second transformed signal is generated from the second signal. The first and/or second transformed signals may, for example, be generated by computational calculation. The first signal is greater than the first signal in amplitude and has the same sign as the first signal. The second signal is greater than the second signal in amplitude and has the same sign as the second signal. At 47, a resultant signal is generated using the first transformed signal and the second transformed signal. For example, the resultant signal may be computationally calculated using the first and second transformed signals. Information encoded in the first signal is provided by decoding the resultant signal at 49.

The second signal may be received from the transponder in one embodiment, or derived by phase-shifting the first signal in another embodiment. For example, the first signal may be shifted by 90 degrees to provide the second signal.

In one embodiment, the first transformed signal may be generated by squaring the first signal while retaining the sign of the first signal. Likewise, the second transformed signal may be generated by squaring the second signal while retaining the sign of the second signal. The resultant signal may be a combination of the first transformed signal and the second transformed signal. In one embodiment, the resultant signal may be the sum of the first transformed signal and the second transformed signal.

Figure 5:
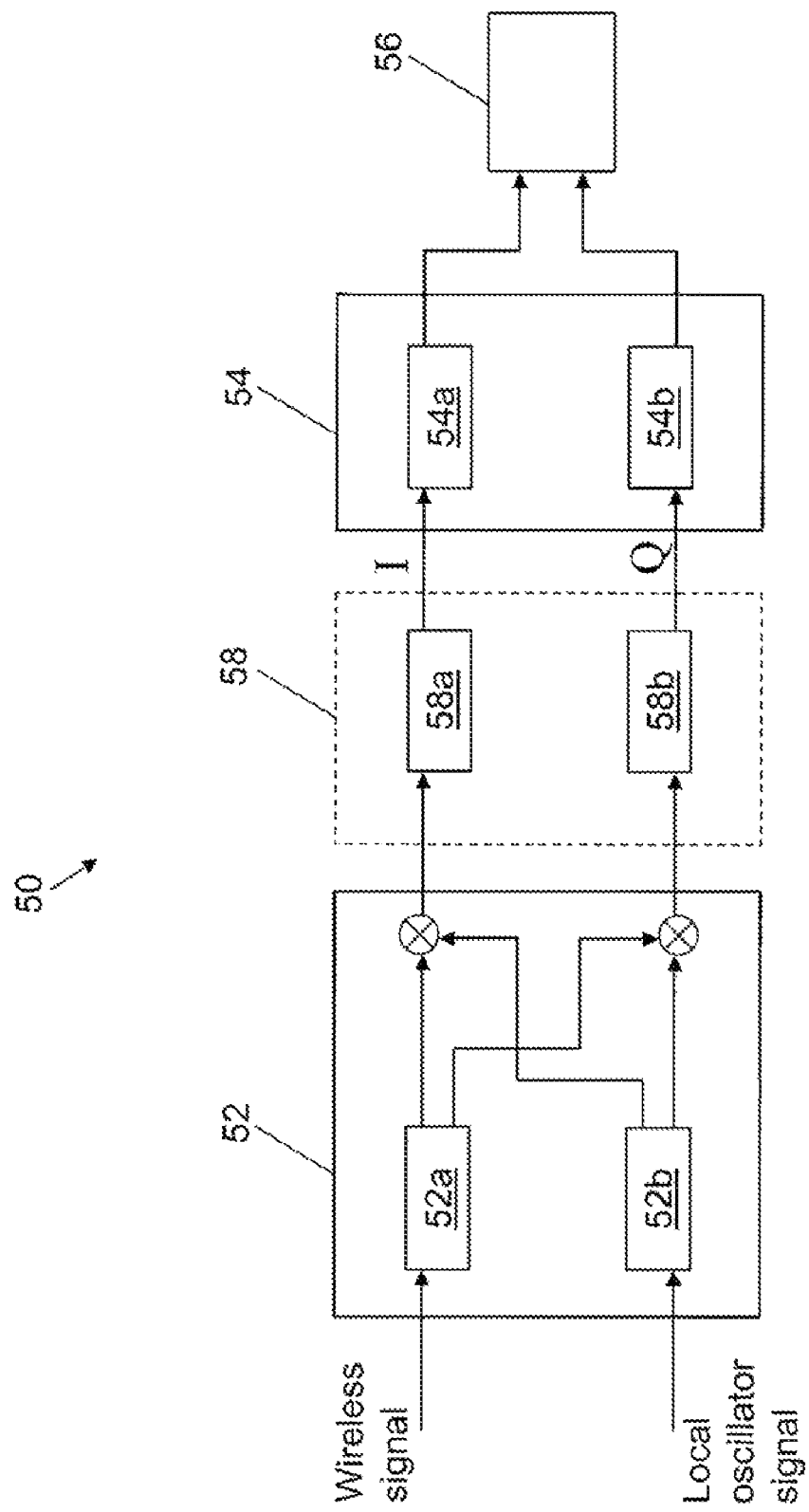
FIG. 5 is a simplified diagram of a communication system according to one non-limiting illustrated embodiment.

FIG. 5 illustrates a communication system 50 according to one non-limiting illustrated embodiment. The communication system 50 may include a first circuit 52, a second circuit 54, a third circuit 56, and an optional filter circuit 58.

The first circuit 52 receives a wireless signal from a signal source (e.g., the transponder signal 25 from the RFID transponder 20) and provides a first signal as well as a second signal that differs from the first signal in phase. In one embodiment, the first circuit 52 includes a first splitter 52a that receives the wireless signal, and a splitter 52b that receives a clock signal from a local oscillator (not shown) to phase-shift the received signal by, for example, 90 degrees. The first circuit outputs a first signal that is in-phase with the received signal and a second signal that is in quadrature with the first signal. Operation and structure of splitters such as the splitters 52a and 52b are well known in the art, and thus in the interest of brevity will not be described in detail.

Before the second circuit 54 receives the first and the second signals from the first circuit 52, there may optionally be a filter circuit 58 between the first circuit 52 and the second circuit 54 to filter the first and the second signals. More specifically, the filter circuit 58 may be a low-pass filter that filters the DC or low-frequency portion of each of the first and the second signals. As shown in FIG. 5, the filter circuit 58 may have a first filter 58a that low-pass filters the first signal and a second filter 58b that low-pass filters the second signal. Operation and structure of low-pass filters such as the filters 58a and 58b are well known in the art, and thus in the interest of brevity will not be described in detail.

The signals received by the second circuit 54, labeled as the I and Q signals in FIG. 5, are transformed by the second circuit 54 to provide a first transformed signal and a second transformed signal. In one embodiment, the second circuit 54 may have a first transformation component 54a and a second transformation component 54b. The first transformation component 54a transforms the I signal to provide the first transformed signal that is greater than the first signal in amplitude and has the same sign as the first signal. The second transformation component 54b transforms the Q signal to provide the second transformed signal that is greater than the second signal in amplitude and has the same sign as the second signal. Operation and structure of circuits that perform mathematical transformation, such as the transformation components 54a and 54b, are well known in the art, and thus in the interest of brevity will not be described in detail.

The third circuit 56 receives the first and the second transformed signals from the second circuit 54 to obtain the information encoded in the received wireless signal. In one embodiment, the third circuit 56 combines the first and the second transformed signals to provide a combined signal from which the information encoded in the wireless signal is derived. In one embodiment, the third circuit 56 sums the first and the second transformed signals to provide the combined signal. In one embodiment, the third circuit 56 includes circuit that combines two signals and a decoder circuit that decodes a signal to obtain information encoded in the signal. Operation and structure of circuits that combine signals and circuits that decode signals, such as the third circuit 56, are well known in the art, and thus in the interest of brevity will not be described in detail.

The communication system 50 may be an RFID base station or an RFID reader, for example, but is not limited to RFID applications. For instance, the communication system 50 may be a non-RFID system that receives and decodes a wireless signal from a signal source that is moving at a high speed relative to the communication system 50. The various components of the communication system 50, including the first circuit 52, the second circuit 54, the third circuit 56, and the filter circuit 58, need not be physically embodied in one integrated piece of equipment or device and can be located in more than one physically separate pieces of equipment. Alternatively, the communication system 50 may be embodied in a semiconductor integrated circuit (e.g., a processor) or a single piece of equipment, such as an RFID reader. Moreover, the function of one or more of the first circuit 52, the second circuit 54, the third circuit 56, and the filter circuit 58 may be implemented by hardware, software, or a combination of hardware and software.

Figure 6:
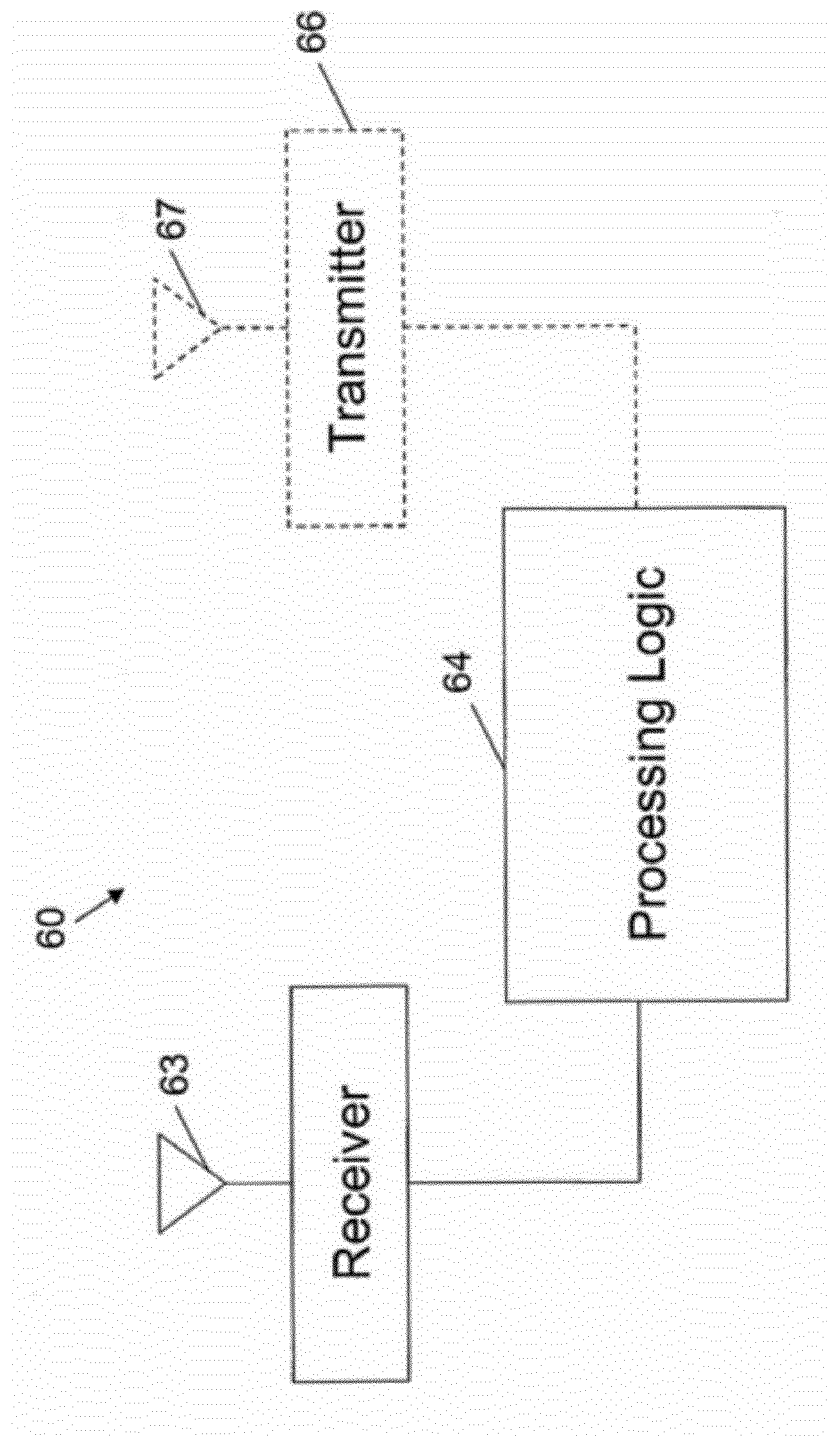
FIG. 6 is a simplified diagram of an RFID system according to one non-limiting illustrated embodiment.

FIG. 6 illustrates an RFID system 60 according to one non-limiting illustrated embodiment. The RFID system 60 includes a receiver 62 and a processing logic 64 coupled to the receiver 62. The RFID system 60 may optionally include a transmitter 66 or one or more antennas 67 to transmit a query signal. In one embodiment, the RFID system 60 may be an RFID base station. In another embodiment, the RFID system 60 may be a portable RFID reader or other RFID device that can receive and decode signals from RFID transponders. In one embodiment, the receiver 62 may include one or more separate antennas 63 or may employ the same antenna 67 as used by the transmitter 66.

The receiver 62 receives a transponder signal and provides the transponder signal to the processing logic 64. Based on the transponder signal, the processing logic 64 provides a first signal as well as a second signal that is different in phase with the first signal, e.g., being in quadrature or being some degrees other than 90 degrees different in phase, and transforms the first and the second signals into a first transformed signal and a second transformed signal, respectively. The first transformed signal is a multiple of the first signal and has the same sign as the first signal. The second transformed signal is a multiple of the second signal and has the same sign as the second signal. The processing logic 64 combines the first and the second transformed signals to determine information encoded in the transponder signal.

In one embodiment, the processing logic 64 squares the value of the first signal and retains the sign of the first signal to provide the first transformed signal. In one embodiment, the processing logic 64 squares the value of the second signal and retains the sign of the second signal to provide the second transformed signal. In one embodiment, the processing logic 64 sums the first and the second transformed signals to provide a combined signal, which is decoded by the processing logic 64 to determine the information encoded in the transponder signal.

In one embodiment, the processing logic 64 may be in the form of a semiconductor integrated circuit (e.g., a processor), one or more circuits, or one or more physically-separated devices. In one embodiment, the receiver 62, the processing logic 64, and the transmitter 66 may be physically embodied in one integrated piece of equipment or device. The functions performed by the processing logic 64 may be implemented by hardware, software, or a combination of hardware and software.

Thus, methods and devices to read an RFID transponder moving at a relatively high speed, such as a speed greater than 15 mph, are disclosed herein. For instance, when a transponder signal is received, a corresponding in-phase signal and a corresponding quadrature signal are transformed to provide transformed signals that are greater in amplitude but retain the respective sign of the in-phase and the quadrature signals. It is the transformed signals that are used to produce a resultant signal from which the information encoded in the transponder signal is decoded. The transformation of the in-phase signal and the quadrature signal helps alleviate the problems associated with reading an RFID transponder that is moving at a speed over 15 mph as described above.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other context, not necessarily the exemplary context of reading an RFID transponder generally described above. It will be understood by those skilled in the art that, although the embodiments described above and shown in the figures are generally directed to the context of RFID, applications for processing wireless signals received from a moving signal source may also benefit from the concepts described herein.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

I claim:

1. A method of processing a transponder signal received from a transponder to identify the transponder, the method comprising:

providing a first signal from the transponder signal, the first signal having a first and a second characteristics;

providing a second signal that is different in phase with respect to the first signal, the second signal having a first and a second characteristics;

generating a first transformed signal by altering the first characteristic of the first signal and retaining the second characteristic of the first signal to provide the first transformed signal; the first transformed signal comprising squaring a value of the first signal and retaining a sign of the first signal to provide the first transformed signal;

generating a second transformed signal by altering the first characteristic of the second signal and retaining the second characteristic of the second signal to provide the second transformed signal; the second transformed signal comprising squaring a value of the second signal and retaining a sign of the second signal to provide the second transformed signal; and obtaining information incorporated in the transponder signal using a combination of the first transformed signal and the second transformed signal.

2. The method of claim 1 wherein obtaining information incorporated in the transponder signal using a combination of the first transformed signal and the second transformed signal comprises summing the first transformed signal and the second transformed signal to provide a resultant signal, and decoding the resultant signal to provide information incorporated in the transponder signal.

3. The method of claim 1 wherein obtaining information incorporated in the transponder signal using a combination of the first transformed signal and the second transformed signal comprises obtaining identification information associated with the transponder using a combination of the first transformed signal and the second transformed signal.

4. The method of claim 1 wherein providing a second signal that is different in phase with respect to the first signal comprises phase-shifting the first signal by 90 degrees to provide the second signal.

5. The method of claim 1 wherein providing a first signal from the transponder signal comprises receiving the transponder signal from the transponder that is moving at a relative speed of at least 15 miles per hour to provide the first signal.

6. A method of a transponder reader, the method comprising:

receiving a first signal from the transponder;
receiving a second signal from the transponder; the second signal differing from the first signal in phase;
generating a first transformed signal from the first signal and a second transformed signal from the second signal, the first transformed signal being greater than the first signal in amplitude and having the same sign as the first signal, the second transformed signal being greater than the second signal in amplitude and having the same sign as the second signal;
providing a resultant signal using the first transformed signal and the second transformed signal; and
decoding the resultant signal to provide information encoded in the received signal.

7. The method of claim 6 wherein the second signal comprises phase-shifting the first signal by a predetermined amount of degrees to provide the second signal.

8. The method of claim 6 wherein generating a first transformed signal from the first signal and a second transformed signal from the second signal comprises squaring the first signal and retaining the sign of the first signal to provide the first transformed signal, and computationally squaring the second signal and retaining the sign of the second signal to provide the second transformed signal.

9. The method of claim 6 wherein providing a resultant signal using the first transformed signal and the second transformed signal comprises combining the first transformed signal and the second transformed signal to provide the resultant signal.

10. The method of claim 6 wherein providing a resultant signal using the first transformed signal and the second transformed signal comprises summing the first transformed signal and the second transformed signal to provide the resultant signal.

11. The method of claim 6 wherein generating a first transformed signal from the first signal and a second transformed signal from the second signal comprises computationally calculating the first transformed signal from the first signal and the second transformed signal from the second signal.

12. The method of claim 6 wherein receiving the first signal from the transponder comprises receiving the first signal from the transponder that is moving at a relative speed of at least 15 miles per hour.

13. A communication system, comprising:

a first circuit to receive a wireless signal from a signal source and to provide a first signal and a second signal that differs from the first signal in phase using the wireless signal;
a second circuit to receive the first and the second signals and to generate a first transformed signal and a second transformed signal from the first signal and the second signal, respectively, the first transformed signal being greater than the first signal in amplitude and having the same sign as the first signal, the second transformed signal being greater than the second signal in amplitude and having the same sign as the second signal; and
a third circuit to receive the first and the second transformed signals and to derive information encoded in the wireless signal using the first and the second transformed signals.

14. The communication system of claim 13, further comprising:

a filter circuit to receive the first and the second signals from the first circuit and to filter out a respective portion of each of the first and the second signals before providing the filtered first and the filtered second signals to the second circuit.

15. The communication system of claim 14 wherein the filter circuit includes a first low-pass filter to low-pass filter the first signal and a second low-pass filter to low-pass filter the second signal.

16. The communication system of claim 13 wherein the second circuit generates the first transformed signal to have a value related to a squared value of the first signal and a sign of the first signal, and wherein the second circuit generates the second transformed signal to have a value related to a squared value of the second signal and a sign of the second signal.

17. The communication system of claim 13 wherein the third circuit combines the first and the second transformed signals to provide a combined signal from which the information encoded in the wireless signal is derived.

18. The communication system of claim 17 wherein the third circuit sums the first and the second transformed signals to provide the combined signal.

19. The communication system of claim 13 wherein the first, the second, and the third circuits are parts of a processor.

20. The communication system of claim 13 wherein the wireless signal is received from the signal source that has a speed of at least 15 miles per hour relative to the first circuit.

21. A radio frequency identification (RFID) system, comprising:

at least one antenna to receive a transponder signal; and
a processing logic coupled to the at least one antenna, the processing logic to provide a first signal and a second signal having a phase different from a phase of the first signal based on the transponder signal and to transform the first and the second signals into a first transformed signal and a second transformed signal, respectively, where the first transformed signal is a multiple of the first signal and has the same sign as the first signal, and where the second transformed signal is a multiple of the second signal and has the same sign as the second signal, the processing logic to combine the first and the second transformed signals to determine information encoded in the transponder signal.

22. The RFID system of claim 21 wherein the processing logic squares the value of the first signal and retains the sign of the first signal to provide the first transformed signal, and wherein the processing logic squares the value of the second signal and retains the sign of the second signal to provide the second transformed signal.

23. The RFID system of claim 21 wherein the processing logic sums the first and the second transformed signal to provide a combined signal, and wherein the processing logic decodes the combined signal to determine the information encoded in the transponder signal.

24. The RFID system of claim 21, further comprising:
a transmitter that transmits a query signal to an RFID transponder which returns the transponder signal in response to receiving the query signal.

25. The RFID system of claim 21 wherein the processing logic comprises a processor.

26. The RFID system of claim 21 wherein the receiver receives the transponder signal from an RFID transponder moving at a speed of at least 15 mile per hour relative to the RFID system.

27. The RFID system of claim 21 wherein the phase of the first signal and the phase of the second signal are in quadrature.

* * * * *